United States Patent Office 3,252,926
Patented May 24, 1966

3,252,926
ACETYLATED ESTERIFICATION PRODUCT OF RICINOLEIC ACID AND AN EPOXY RESIN AND FLEXOGRAPHIC INK COMPOSITIONS THEREOF
Howard T. Roth, Ridgewood, N.Y., assignor to Interchemical Corporation, New York, N.Y., a corporation of Ohio
No Drawing. Filed Sept. 28, 1962, Ser. No. 227,038
4 Claims. (Cl. 260—13)

This invention relates to new inks for flexographic printing and to novel acetylated epoxy resin esters which are incorporated in said inks.

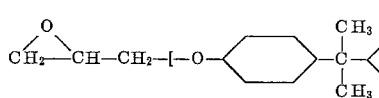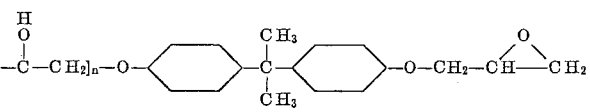

Flexographic printing is a letter-press process and is characterized by the fact that the ink is applied to the work by rotary rubber plates. Due to the great flexibility of this process, its low operating costs, and the extremely high press speeds, possible even when printing on troublesome stocks, it is widely used for printing on packaging materials for food products such as cellophane, glassine, polyethylene films and metal foils.

While flexographic inks may be prepared employing a wide variety of solvents or dispersant fluids, including even water, hydrocarbons, esters, and ketones, the most important and widely used inks of this class are those containing primarily alcohol-type solvents such as methanol, ethanol, denatured alcohol, isopropanol, ethylene glycol monomethyl ether, ethylene glycol monoethyl ether, etc. Often small amounts of compatible non-alcohol solvents are also employed, such as acetone, methyl ethyl ketone, methyl-isobutyl ketone, dioxane, ethyl acetate, isopropyl acetate, etc., since these may aid in dissolving or dispersing the binder resin. The proportion of alcohol employed in the ink is generally between about 30% and about 75%, and the alcohol usually employed is ethanol.

While a wide variety of resins may be employed in flexographic inks, nitrocellulose and ethylcellulose particularly the former are the most widely used resins. Because of its low cost and unique combination of valuable properties nitrocellulose constitutes at least part of the resin content of most flexographic inks. Nitrocellulose has unusually good pigment-wetting properties, and its films are hard, tough, adherent, and heat-resisting.

Efforts to use conventional flexographic inks containing nitrocellulose or ethylcellulose on parchment packaging materials for greasy or oily food products such as bacon, ham, butter and lard have not been too successful because the oil from the food which penetrated the parchment causes significant bleeding of the printed ink.

Attempts to formulate flexographic inks containing nitrocellulose and ethylcellulose have been hampered by the fact that many proposed additives to the inks for the prevention of bleeding were found to be incompatible with the ethyl cellulose and nitrocellulose.

I have now found a novel acetylated epoxy resin ester which is compatible with nitrocellulose and ethylcellulose and when incorporated into flexographic inks containing said compounds provides new flexographic inks which do not bleed when used on parchment wrappers for oily foods of the types described.

The novel acetylated epoxy resin ester of this invention is the acetylated esterification product of a hydroxy $C_{18}$ fatty acid, most preferably ricinoleic acid and an epoxy resin such as the Epon resins which are conventionally prepared by reacting a polyhydric alcohol particularly Bisphenol A with epichlorohydrin. By regulating the proportions of these two reactants, the molecular size and the molecular structure of the epoxy resins produced may be controlled. By using an excess of epichlorohydrin, a low molecular weight epoxy resin is produced and by increasing the amount of Bisphenol A, the molecular weight of the epoxy resin is increased. The epoxy resins have substantially the following structure with the molecular weight being dependent upon the value of $n$. While the molecular weight of the epoxy resins used may vary from about 350 to 5000, I have found that the ink product gives the most desirable results when the epoxy resin has a molecular weight of about 850 to about 1,000. I, therefore, prefer to use Epon 1001 in making my novel epoxy resin esters. Epon 1001 has an average molecular weight of 875, an epoxide equivalent weight of 450–525, an average of 1.7 to 1.9 epoxides per molecule and the above structural formula where $n=2$.

While the above structural formula shows Epon 1001 and other epoxy resins to consist of diepoxide molecules, it should be noted that neither the Epon resins nor any other commercially available epoxy resins consist entirely of molecules of a single type. Consequently Epon 1001 is actually not entirely a diepoxide resin. Some side reactions in the preparation of these resins—such as termination of the chain with a bisphenol molecule instead of epichlorohydrin, or conversion of epoxide to glycol—to reduce the epoxide content to a minor extent. However, for the sake of convenience in description, the preferred resins of this invention are referred to and shown as substantially diepoxide resins.

It should be noted that in the present specification and claims all proportions are by weight unless otherwise stated.

For best results, it is important that the hydroxyl groups in the epoxy resin remain substantially unesterified by the ricinoleic acid. This may be accomplished by carrying out the esterification of the epoxy resin and acid at a temperature below 170° C., preferably 80° to 150° C. and most preferably 105° to 120° C. The epoxy groups of the epoxy resins are more readily esterified with carboxylic acids than are the hydroxyl groups, the latter requiring temperatures well over 170° C. to esterify. Thus, by maintaining the temperature below 170° C., the hydroxyl groups remain substantially unesterified. The absence of esterification of the hydroxyl groups is indicated by the lack of water formation during the esterification reaction. Because esterification of the epoxy groups by heat alone at temperatures below 170° C. is very difficult, catalysts are preferably used. Catalysts such as potassium hydroxide and quaternary ammonium hydroxides e.g., benzyltrimethyl ammonium hydroxide are suitable. However, best results are achieved using tertiary amine catalysts such as trimethylamine, triethylamine, benzyldimethylamine, dimethyl amino methyl phenol and tridimethylamine methyl phenol. The catalyst preferably constitutes from 0.20% to 0.75% of the weight of epoxy resin used.

It is preferable the reaction mixture initially contains a sufficient number of carboxyl groups to esterify substantially all of the epoxy groups present. Any unesterified epoxy groups tend to undergo crosslinking during the subsequent acetylation reaction to be hereinafter described. Substantial crosslinking is undesirable since it will reduce the solubility of the final acetylated epoxy ester. Accordingly, one carboxyl group is preferably present for each epoxy group. It is most preferable that the ratio of carboxyl groups to epoxy groups be near 1:1 since if a significant excess of ricinoleic acid is present, the resulting softening of the product may be less than desirable.

After esterification, the esterification product is acetylated. This may be conveniently accomplished by reacting the product with acetic anhydride. Preferably, sufficient acetic anhydride is used to provide from 1 to 2.5 acetyl groups for each hydroxyl group present in the esterified ricinoleic acid.

It should be noted that it is critical for the epoxy resin ester to be acetylated. Without acetylation, the epoxy resin ester described above was found to be incompatible with nitrocellulose and ethylcellulose and could not be formulated into the novel inks of this invention.

The inks of the invention comprise a solution of either nitrocellulose or ethylcellulose and the novel acetylated epoxy resin ester in the flexographic ink solvents described above. Preferably from 0.5 to 3.0 parts of the acetylated epoxy resin ester are present in the ink for each part of nitrocellulose and ethylcellulose present. The inks may in addition contain a variety of other resins conventionally used in flexographic inks including shellac, acrylic ester resins, cellulose acetate, cellulose acetate-propionate, cellulose propionate, cellulose acetate-butyrate, cellulose butyrate, various alkyd resins, modified rosins and polyamide resins.

As coloring matter for the flexographic inks, any of the pigments and dye conventionally used in flexographic inks may be used. Suitable pigments include Lithol Red, Watchung Red, titanium dioxide, Carbon Black, Iron Blue and various lakes. Suitable dyes include methyl violet and Rhodamine.

In my novel inks the nitrocellulose or ethylcellulose, solvents, other resins and pigment are present in quantities conventional for flexographic inks. The nitrocellulose and ethylcellulose may conveniently comprise from 5 to 12% of the ink weight, the solvent from 45 to 65% of the ink weight, the coloring matter from 10 to 30% of the ink weight and the additional resins up to 15% of the ink weight.

The following examples will further illustrate the practice of this invention:

*Example 1*

A mixture of 732 g. of Epon 1001, 447 g. of ricinoleic acid and 3.7 g. of N,N-dimethyl benzylamine is maintained at 110–120° C. until an acid value of less than 2 is reached. The reaction mixture is then cooled to about 95° C. and 153 g. of acetic anhydride are added slowly over a period of ½ hour. The mixture is then heated to 100–105° C. and maintained at said temperature for 4 to 5 hours. The remaining acetic acid is then removed by vacuum stripping at a pressure of 30 to 40 mm. and a temperature of 160° C. The acetylated ester has an acid value of 0.5 to 1.0.

*Example 2*

The following ingredients are mixed to form a red ink.

| | Parts |
|---|---|
| The acetylated ester product of Example 1 | 10.90 |
| Nitrocellulose | 7.57 |
| Calcium lithol pigment | 12.70 |
| Dibutyl phthalate | 4.53 |
| Ethanol | 43.76 |
| n-Propyl acetate | 20.54 |

Sufficient ethanol is added to reduce the viscosity of the ink to a viscosity of 20–30 secs. #2 Zahn Cup. The ink is then used in a flexographic printing press to print on white parchment. The printing is sharp and exhibits a good gloss. Several food products which are generally classified as greasy or oily including ham, butter, lard and bacon are wrapped in the printed parchment. After 3–4 days, while the oils have completely penetrated through the parchment, there is no sign of bleeding in the printed ink.

*Example 3*

Example 2 is repeated using the same ingredients, proportions and conditions except that ethylcellulose is used in place of nitrocellulose. The resulting printed parchments display the same described properties as the printed parchment of Example 2 including resistance to bleeding.

While there have been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. The acetylated esterification product of ricinoleic acid and an epoxy resin having the formula:

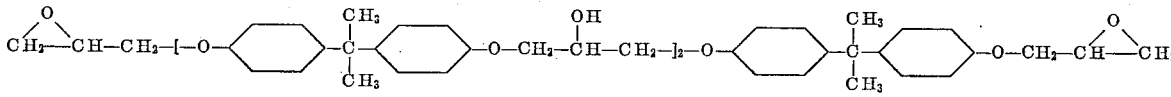

said esterification being carried out at a temperature of 80 to 150° C., the hydroxyl groups in said resin remaining unesterified during the esterification reaction.

2. The acetylated esterification product of claim 1 wherein equivalent amounts of epoxy groups and carboxyl groups are present during the esterification reaction.

3. A flexographic ink comprising coloring matter and a solution of the acetylated esterification product of claim 1 and a member selected from the group consisting of nitrocellulose and ethylcellulose in a volatile solvent.

4. A flexographic ink comprising coloring matter and a solution of the acetylated esterification product of claim 2 and a member selected from the group consisting of nitrocellulose and ethylcellulose in a volatile solvent.

References Cited by the Examiner

UNITED STATES PATENTS

| | | | |
|---|---|---|---|
| 2,390,390 | 12/1945 | Rietz et al. | 106—26 |
| 2,759,901 | 8/1956 | Greenlee | 260—47 |
| 2,826,562 | 3/1958 | Shokal | 260—484 |
| 3,017,374 | 1/1962 | Bernardi et al. | 260—18 |

JOSEPH L. SCHOFER, *Primary Examiner.*

JAMES A. SEIDLECK, *Assistant Examiner.*